United States Patent
Ohmi

(10) Patent No.: US 8,315,270 B2
(45) Date of Patent: Nov. 20, 2012

(54) COMMUNICATION METHOD AND COMMUNICATION APPARATUS

(75) Inventor: Shinichiro Ohmi, Osaka (JP)

(73) Assignee: Panasonic Corporation, Osaka (JP)

( * ) Notice: Subject to any disclaimer, the term of this patent is extended or adjusted under 35 U.S.C. 154(b) by 373 days.

(21) Appl. No.: 12/651,101

(22) Filed: Dec. 31, 2009

(65) Prior Publication Data
US 2010/0172369 A1 Jul. 8, 2010

(30) Foreign Application Priority Data

Jan. 5, 2009 (JP) ................................ 2009-000339

(51) Int. Cl.
*H04L 12/413* (2006.01)
(52) U.S. Cl. ...................................................... 370/445
(58) Field of Classification Search .......... 370/445–463; 455/270, 402
See application file for complete search history.

(56) References Cited

U.S. PATENT DOCUMENTS

| 2004/0208203 A1 | 10/2004 | Uda |
| 2008/0279126 A1 | 11/2008 | Katar |
| 2008/0301253 A1* | 12/2008 | Ohmi et al. .................... 709/209 |
| 2009/0022163 A1* | 1/2009 | Oksman ......................... 370/400 |
| 2009/0046593 A1* | 2/2009 | Ptasinski et al. .............. 370/252 |

FOREIGN PATENT DOCUMENTS

| JP | 2006-246035 | 9/2006 |
| JP | 2007-166104 | 6/2007 |

OTHER PUBLICATIONS

PCT International Search Report dated Apr. 6, 2010.

* cited by examiner

*Primary Examiner* — Frank Duong
(74) *Attorney, Agent, or Firm* — Dickinson Wright PLLC

(57) ABSTRACT

A communication method of communicating among a plurality of communication apparatuses connected to a transmission channel and sharing a communication band is provided. The communication method includes: sequentially updating a slot ID with the lapse of time by a first communication apparatus; transmitting first data and a first access ID to the transmission channel by the first communication apparatus after the lapse of a first waiting time and when the slot ID is updated to a first slot ID corresponding to the first access ID; transmitting second data and a second slot ID to the transmission channel by a second communication apparatus after the lapse of a second waiting time longer than the first waiting time; and receiving the second slot ID by the first communication apparatus. In updating the slot ID, the slot ID is updated to a slot ID subsequent to the second slot ID.

11 Claims, 11 Drawing Sheets

FIG.6

| SLAVE MANAGEMENT NUMBER (MAC ADDRESS) | ACCESS ID |
|---|---|
| O (00:80:F0:5F:00:00) | 1 |
| B1 (00:80:F0:5F:00:01) | 3 |
| B2 (00:80:F0:5F:00:02) | 2 |
| B3 (00:80:F0:5F:00:03) | 4 |
| B4 (00:80:F0:5F:00:04) | — |
| B5 (00:80:F0:5F:00:05) | — |
| B6 (00:80:F0:5F:00:06) | — |
| B7 (00:80:F0:5F:00:07) | — |
| B8 (00:80:F0:5F:00:08) | — |
| B9 (00:80:F0:5F:00:09) | — |

FIG.7

| SUB-SLAVE MANAGEMENT NUMBER (MAC ADDRESS) |
|---|
| C1 (00:80:F0:5F:10:01) |
| C2 (00:80:F0:5F:10:02) |
| C3 (00:80:F0:5F:10:03) |
| C4 (00:80:F0:5F:10:04) |
| C5 (00:80:F0:5F:10:05) |
| C6 (00:80:F0:5F:10:06) |
| C7 (00:80:F0:5F:10:07) |
| C8 (00:80:F0:5F:10:08) |
| C9 (00:80:F0:5F:10:09) |

FIG. 10A

FIXED PART

| PRIORITY DIFFERENCE | NUMBER OF ACTIVE IDs | | | | | | | |
|---|---|---|---|---|---|---|---|---|
| | 1 | 2 | 3 | 4 | 5 | 6 | 7 | 8 |
| 0 OR LESS | 0 | 0 | 0 | 0 | 0 | 0 | 0 | 0 |
| 1 | 0 | 2 | 3 | 3 | 3 | 3 | 3 | 3 |
| 2 | 0 | 2 | 3 | 3 | 3 | 3 | 3 | 3 |
| 3 | 0 | 2 | 3 | 4 | 5 | 5 | 6 | 6 |
| 4 | 0 | 3 | 4 | 5 | 6 | 7 | 8 | 8 |
| 5 | 0 | 6 | 7 | 12 | 13 | 14 | 15 | 23 |
| 6 | 0 | 9 | 10 | 19 | 20 | 21 | 22 | 38 |
| 7 OR MORE | 0 | 12 | 13 | 26 | 27 | 28 | 29 | 53 |

FIG. 10B

RANDOM PART

| PRIORITY DIFFERENCE | NUMBER OF ACTIVE IDs | | | | | | | |
|---|---|---|---|---|---|---|---|---|
| | 1 | 2 | 3 | 4 | 5 | 6 | 7 | 8 |
| 0 OR LESS | 0 | 0 | 0 | 0 | 0 | 0 | 0 | 0 |
| 1 | 0 | 1 | 1 | 1 | 1 | 1 | 1 | 1 |
| 2 | 0 | 3 | 3 | 3 | 3 | 3 | 3 | 3 |
| 3 | 0 | 3 | 3 | 7 | 7 | 7 | 7 | 7 |
| 4 | 0 | 3 | 3 | 7 | 7 | 7 | 7 | 15 |
| 5 | 0 | 3 | 3 | 7 | 7 | 7 | 7 | 15 |
| 6 | 0 | 3 | 3 | 7 | 7 | 7 | 7 | 15 |
| 7 OR MORE | 0 | 3 | 3 | 7 | 7 | 7 | 7 | 15 |

COMMUNICATION METHOD AND COMMUNICATION APPARATUS

BACKGROUND

1. Technical Field

The present invention relates to a communication method and a communication apparatus for communication among a plurality of communication apparatuses using a common transmission channel by sharing a communication band.

2. Background Art

In communication systems using power line communications (PLC) or wireless LAN (Local Area Network), a plurality of communication apparatuses communicate with one another using a common transmission channel by sharing a communication band. Accordingly, when the plurality of communication apparatuses simultaneously transmits signals to the transmission channel, collision occurs and thus it is difficult to perform communication. Therefore, it is necessary to avoid such access collisions from the plurality of communication apparatuses to the transmission channel.

As one of methods for avoiding such access collisions of, CSMA/CA (Carrier Sense Multiple Access with Collision Avoidance) has been known. In the CSMA/CA, each communication apparatus recognizes the usage circumstances of a transmission channel, and transmits a signal when other communication apparatuses are not using the transmission channel. Specifically, the communication apparatus senses whether or not there is a carrier (carrier signal) of the signal transmitted by another communication apparatus. When the communication apparatus senses the carrier, the communication apparatus waits until the communication performed by the other communication apparatus is completed. Meanwhile, if the communication apparatus does not sense the carrier, the communication apparatus tries to transmit a signal after additionally waiting for a waiting time called a backoff time. By determining the backoff time on the basis of a random value or the like, even when a plurality of communication apparatuses share the same transmission channel, it is possible to reduce the frequency of contention and further to raise the use efficiency of the transmission channel.

As a known art related to the communication using the CSMA/CA, it has been known to perform multiplexing of frames to improve transmission efficiency of the frames (e.g., see JP-A-2006-246035). In addition, an art for allowing CSMA and TDMA (Time Division Multiple Access) to coexist on the same transmission channel has been known (e.g., see JP-A-2007-166104).

A communication network connected to a power line communication apparatus performing the known power line communication includes one or more power line communication apparatuses as slave apparatuses, and power line communication apparatuses as master apparatuses for managing them. There is an upper limit in the total number of the power line communication apparatuses as master apparatuses and the power line communication apparatuses as slave apparatuses which are connectable to one communication network or a common transmission channel, for example, it is limited to 255. In addition, it is important to allow relatively low speed power line communication apparatuses, which do not need high speed control data and commands, to coexist with known high speed power line communication apparatuses without having an influence on the performance of the high speed power line communication apparatuses.

However, according to used applications, there is a case where a desired process cannot be performed in the range of the limited number of the power line communication apparatuses in such one communication network.

For example, the known power line communication apparatus as master or slave apparatuses needs to sense beacon signals periodically transmitted from the power line communication apparatuses as the master apparatuses, or each slave apparatus needs to correctly recognize a time slot assigned to itself. Accordingly, a microcomputer with high throughput or a high-performance logic circuit is necessary to perform communication control. Such a microcomputer with high performance or the like is expensive.

If it is necessary to additionally install more power line communication apparatuses, it is preferable that the power line communication apparatus can be additionally installed as inexpensively as possible. In this case, signal collision with signals transmitted by the other power line communication apparatuses has to be necessarily avoided in the same manner as the known power line communication apparatuses as master or slave apparatuses.

SUMMARY

An object of the invention is to inexpensively provide a communication method and a communication apparatus capable of avoiding signal collision with signals transmitted from the other communication apparatuses.

An aspect of the present invention provides a communication method of communicating among a plurality of communication apparatuses connected to a transmission channel and sharing a communication band, the communication method including: a slot ID updating step of sequentially updating a slot ID with the lapse of time by a first communication apparatus, the slot ID for identifying a specific slot from a plurality of slots representing division of transmission time; a first transmitting step of transmitting first data and a first access ID to the transmission channel by the first communication apparatus after the lapse of a first waiting time and when the slot ID is updated to a first slot ID corresponding to the first access ID assigned to the first communication apparatus, during a carrier non-sense period when no carrier is sensed on the transmission channel; a second transmitting step of transmitting second data and a second slot ID to the transmission channel by a second communication apparatus after the lapse of a second waiting time longer than the first waiting time, during a carrier non-sense period when no carrier is sensed on the transmission channel; and a first receiving step of receiving the second slot ID by the first communication apparatus, wherein, in the slot ID updating step, the slot ID is updated to a slot ID subsequent to the second slot ID.

According to the communication method, in the first communication apparatus (e.g., master apparatus and slave apparatus), data transmission is performed at a specific time by a slot counter after the lapse of the first waiting time. In the second communication apparatus (e.g., sub-slave apparatus), data transmission is performed after waiting for the lapse of the second waiting time, which is longer than the first waiting time as a backoff time. The first communication apparatus uses the ID subsequent to the slot ID transmitted by the second communication apparatus. Accordingly, the second communication apparatus performs the data transmission without using the slot counter, and uses a processing apparatus simpler than that of the first communication apparatus. Therefore, it is possible to inexpensively manufacture the apparatuses. In addition, the sufficient waiting time up to the start of transmission is secured, and thus it is possible to avoid signal collision with signals transmitted by the other communication apparatuses.

Another aspect of the present invention provides a communication apparatus for communicating with another communication apparatus connected to a transmission channel and sharing a communication band, the communication apparatus including: a carrier sensing unit that senses whether or not a carrier is on the transmission channel; and a data transmitting unit that transmits second data and a second slot ID to the transmission channel after the lapse of a second waiting time longer than a first waiting time provided for transmitting data in the other communication apparatus provided with a slot counter for sequentially updating a slot ID for identifying a specific slot from a plurality of slots representing division of transmission time with the lapse of time, during a carrier non-sense period when no carrier is sensed by the carrier sensing unit.

According to the communication apparatus, in the first communication apparatus (e.g., master apparatus and slave apparatus), data transmission is performed at a specific time by a slot counter after the lapse of the first waiting time. In the second communication apparatus (e.g., sub-slave apparatus), data transmission is performed after waiting for the lapse of the second waiting time, which is longer than the first waiting time as a backoff time. The first communication apparatus uses the ID following the slot ID transmitted by the second communication apparatus. Accordingly, the second communication apparatus performs the data transmission without using the slot counter, and uses a processing apparatus simpler than that of the first communication apparatus. Therefore, it is possible to inexpensively manufacture the apparatuses. In addition, the sufficient waiting time up to the start of transmission is secured, and thus it is possible to avoid signal collision with signals transmitted by other communication apparatuses.

Still another aspect of the present invention provides a communication apparatus for communicating with another communication apparatus connected to a transmission channel and sharing a communication band, the communication apparatus including: a carrier sensing unit that senses whether or not a carrier is on the transmission channel; a slot ID updating unit that sequentially updates a slot ID with the lapse of time, the slot ID for identifying a specific slot from a plurality of slots representing division of transmission time; a transmitting unit that transmits first data and a first access ID to the transmission channel after the lapse of a first waiting time and when the slot ID is updated to a first slot ID corresponding to the first access ID assigned to the first communication apparatus, during a carrier non-sense period when no carrier is sensed by the carrier sensing unit; a receiving unit that receives a second slot ID, wherein the slot ID updating unit updates the slot ID to a slot ID subsequent to the received second slot ID.

According to the invention, it is possible to inexpensively avoid signal collision with signals transmitted by other communication apparatuses.

BRIEF DESCRIPTION OF THE DRAWINGS

In the accompanying drawings.

FIG. 6 is a diagram illustrating an example of a slave apparatus management table provided in a PLC modem (master apparatus) according to the embodiment of the invention;
FIG. 7 is a diagram illustrating an example of a sub-slave apparatus management table provided in a PLC modem (slave apparatus) according to the embodiment of the invention;
FIGS. 10A and 10B are diagrams illustrating an example of a table for determining a backoff value according to the embodiment of the invention.

DETAILED DESCRIPTION

Figure 1:
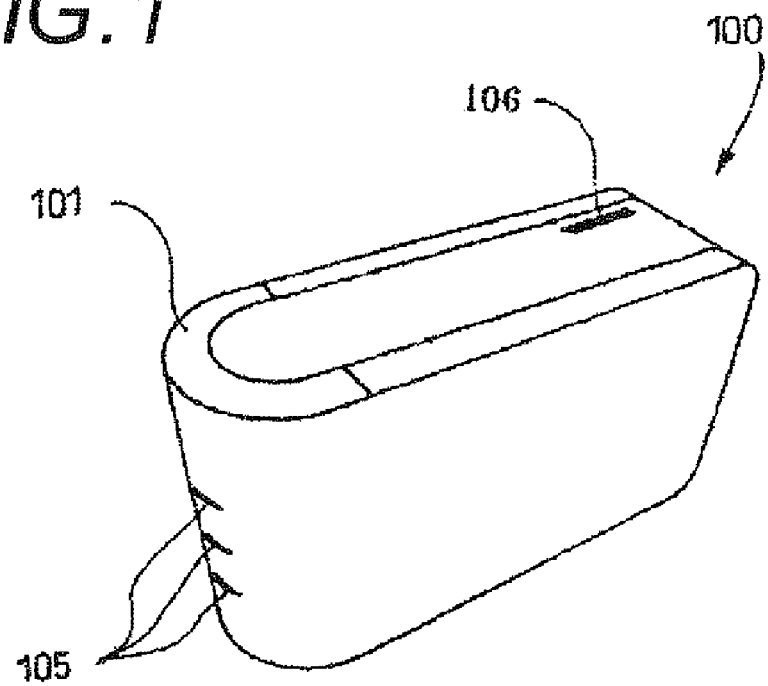
FIG. 1 is an external perspective view illustrating a front of a PLC modem according to an embodiment of the invention.

An aspect of the present invention provides a communication method of communicating among a plurality of communication apparatuses connected to a transmission channel and sharing a communication band, the communication method including: a slot ID updating step of sequentially updating a slot ID with the lapse of time by a first communication apparatus, the slot ID for identifying a specific slot from a plurality of slots representing division of transmission time; a first transmitting step of transmitting first data and a first access ID to the transmission channel by the first communication apparatus after the lapse of a first waiting time and when the slot ID is updated to a first slot ID corresponding to the first access ID assigned to the first communication apparatus, during a carrier non-sense period when no carrier is sensed on the transmission channel; a second transmitting step of transmitting second data and a second slot ID to the transmission channel by a second communication apparatus after the lapse of a second waiting time longer than the first waiting time, during a carrier non-sense period when no carrier is sensed on the transmission channel; and a first receiving step of receiving the second slot ID by the first communication apparatus, wherein, in the slot ID updating step, the slot ID is updated to a slot ID subsequent to the second slot ID.

According to the communication method, in the first communication apparatus (e.g., master apparatus and slave apparatus), data transmission is performed at a specific time by a slot counter after the lapse of the first waiting time. In the second communication apparatus (e.g., sub-slave apparatus), data transmission is performed after waiting for the lapse of the second waiting time, which is longer than the first waiting time as a backoff time. The first communication apparatus uses the ID subsequent to the slot ID transmitted by the second communication apparatus. Accordingly, the second communication apparatus performs the data transmission without using the slot counter, and uses a processing apparatus simpler than that of the first communication apparatus. Therefore, it is possible to inexpensively manufacture the apparatuses. In addition, the sufficient waiting time up to the start of transmission is secured, and thus it is possible to avoid signal collision with signals transmitted by the other communication apparatuses.

The communication method may be configured in that, in the second transmitting step, the second communication apparatus generates the second slot ID on the basis of a pseudorandom number.

According to the communication method, the access ID (slot ID) is determined on the basis of a pseudorandom number generated for every transmission, and thus it is possible to prevent the same value from being continuously used as an access ID. Accordingly, it is possible to perform communication among a plurality of communication apparatuses without bias in transmission time.

The communication method may be configured in that the method further includes a second receiving step of receiving the first slot ID by the second communication apparatus, and in the second transmitting step, the second communication apparatus may use the received first slot ID as the second slot ID.

According to the communication method, as an access ID of the communication apparatus, an access ID used by the other communication apparatus is used. Accordingly, it is possible to prevent the same value from being continuously used as an access ID, and thus it is possible to perform communication among a plurality of communication apparatuses without bias in transmission time.

The communication method may be configured in that, in the second transmitting step, the last received first slot ID in the second receiving step is used as the second slot ID.

According to the communication method, the same access ID as an access ID of the other communication apparatus transmitting the last received first slot ID is used, and thus it is possible to make the other communication apparatus seem to continue data transmission.

The communication method may be configured in that the method further includes a third receiving step of receiving a slot ID from an other communication apparatus by the second communication apparatus, and in the second transmitting step, the second communication apparatus uses the slot ID received from the other communication apparatus as the second slot ID.

According to the communication method, as an access ID of the communication apparatus (e.g., sub-slave apparatus), an access ID used by the other second communication apparatus (e.g., sub-slave apparatus) is used, and thus it is possible to prevent the same value from being continuously used as an access ID. Accordingly, it is possible to perform communication among a plurality of communication apparatuses without bias in transmission time.

The communication method may be configured in that, in the second transmitting step, the last received slot ID from the other communication apparatus in the third receiving step is used as the second slot ID of the second communication apparatus.

According to the communication method, the same access ID as an access ID of the other second communication apparatus (e.g., sub-slave apparatus) transmitting the last received first slot ID is used, and thus it is possible to make the other communication apparatus seem to continue data transmission. In addition, the preceding communication apparatus as a sub-slave apparatus transmitting data uses the access ID used by the further preceding other communication apparatus, and thus it is possible to make the further preceding other communication apparatus seem to continue data transmission.

The communication method may be configured in that the first waiting time is determined on the basis of priority in the first transmitting step, the second waiting time is determined on the basis of priority in the second transmitting step, and the priority of the first transmitting step is higher than the priority of the second transmitting step.

According to the communication method, the transmission priority of the first communication apparatus (e.g., master apparatus or slave apparatus) is higher than the transmission priority of the second communication apparatus (e.g., sub-slave apparatus), and thus it is possible to shorten the waiting time of the first communication apparatus. Accordingly, for example, in case of communication requiring real time such as audio signals and video signals in the first communication, it is possible to minimize delay.

The communication method may be configured in that the frame length of the second data is shorter than the frame length of the first data.

According to the communication method, the length of the data frame of the first communication apparatus (e.g., master apparatus or slave apparatus) is shorter than the length of the data frame of the second communication apparatus (e.g., sub-slave apparatus), and thus the time when a free time occurs on the transmission channel is increased. Accordingly, possibility of performing data transmission at the time desired by the first communication apparatus is increased.

The communication method may be configured in that a power line is used as the transmission channel to perform power line communication.

According to the communication method, even when power line communication is used, it is possible to inexpensively avoid signal collision with signals transmitted by other communication apparatuses.

The communication method may be configured in that, in the slot ID updating step, the slot ID is updated periodically and cyclically.

The communication method may be configured in that, in the slot ID updating step, the slot ID is updated with a cycle of a slot time during a carrier non-sense period when no carrier is sensed on the transmission channel;

whereas the slot ID is not updated during a carrier sense period when a carrier is sensed on the transmission channel, and the slot ID is updated to a slot ID subsequent to the second slot ID after the elapse of the carrier sense period.

Another aspect of the present invention provides a communication apparatus for communicating with another communication apparatus connected to a transmission channel and sharing a communication band, the communication apparatus including: a carrier sensing unit that senses whether or not a carrier is on the transmission channel; and a data transmitting unit that transmits second data and a second slot ID to the transmission channel after the lapse of a second waiting time longer than a first waiting time provided for transmitting data in the other communication apparatus provided with a slot counter for sequentially updating a slot ID for identifying a specific slot from a plurality of slots representing division of transmission time with the lapse of time, during a carrier non-sense period when no carrier is sensed by the carrier sensing unit.

According to the communication apparatus, in the first communication apparatus (e.g., master apparatus and slave apparatus), data transmission is performed at a specific time by a slot counter after the lapse of the first waiting time. In the second communication apparatus (e.g., sub-slave apparatus), data transmission is performed after waiting for the lapse of the second waiting time, which is longer than the first waiting time as a backoff time. The first communication apparatus uses the ID following the slot ID transmitted by the second communication apparatus. Accordingly, the second communication apparatus performs the data transmission without using the slot counter, and uses a processing apparatus simpler than that of the first communication apparatus. Therefore, it is possible to inexpensively manufacture the apparatuses. In addition, the sufficient waiting time up to the start of transmission is secured, and thus it is possible to avoid signal collision with signals transmitted by other communication apparatuses.

The communication apparatus may be configured in that a power line is used as the transmission channel to perform power line communication.

According to the communication apparatus, even when power line communication is used, it is possible to inexpensively avoid signal collision with signals transmitted by other communication apparatuses.

The communication apparatus may be configured in that the second slot ID is set to a slot ID transmitted from the other communication apparatus.

Still another aspect of the present invention provides a communication apparatus for communicating with another communication apparatus connected to a transmission channel and sharing a communication band, the communication apparatus including: a carrier sensing unit that senses whether or not a carrier is on the transmission channel; a slot ID updating unit that sequentially updates a slot ID with the lapse of time, the slot ID for identifying a specific slot from a plurality of slots representing division of transmission time; a transmitting unit that transmits first data and a first access ID to the transmission channel after the lapse of a first waiting time and when the slot ID is updated to a first slot ID corresponding to the first access ID assigned to the first communication apparatus, during a carrier non-sense period when no carrier is sensed by the carrier sensing unit; a receiving unit that receives a second slot ID, wherein the slot ID updating unit updates the slot ID to a slot ID subsequent to the received second slot ID.

(Embodiment)

Hereinafter, a communication method, a communication apparatus, and a communication system according to an embodiment of the invention will be described with reference to the drawings.

Figure 2:
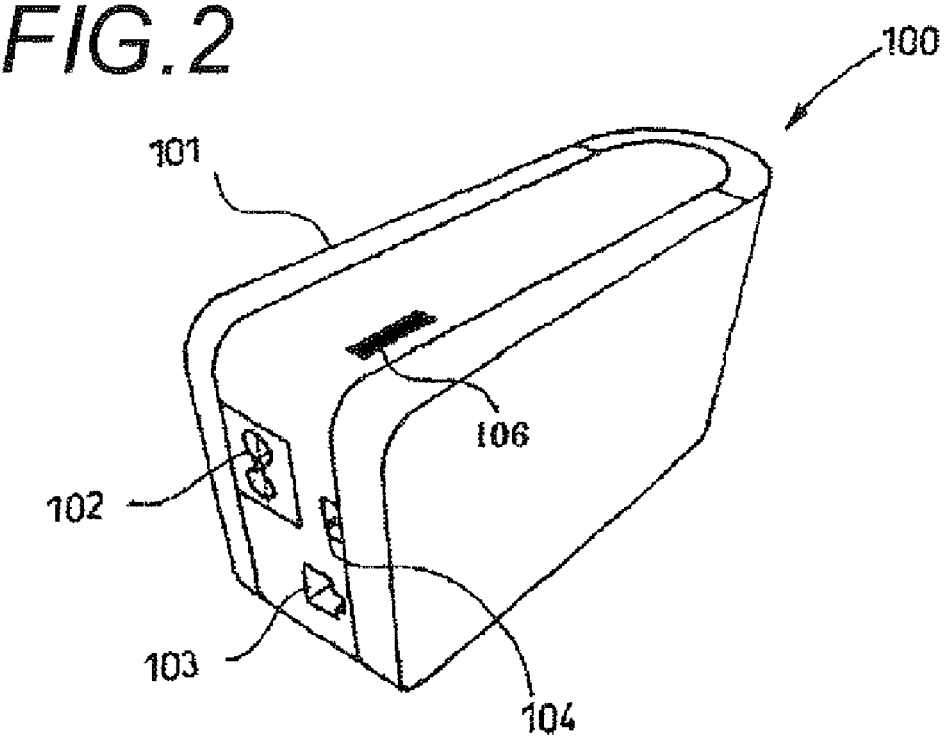
FIG. 2 is an external perspective view illustrating a rear of the PLC modem according to the embodiment of the invention.

FIG. 1 is an external perspective view illustrating a front of a PLC (Power Line Communication) modem 100 as an example of a power line communication apparatus, and FIG. 2 is an external perspective view illustrating a rear of the PLC modem 100. The PLC modem 100 shown in FIG. 1 and FIG. 2 has a case 101, and a display unit 105 such as an LED (Light Emitting Diode) as shown in FIG. 1 is provided on a front of the casing 101.

As shown in FIG. 2, a power supply connector 102, a modular jack 103 for LAN (Local Area Network) such as RJ45, and a switch 104 for switching an operation mode are provided on a rear of the casing 101.

A button 106 is provided on a top of the casing 101. The button 106 functions as a set-up button for starting a process (registration process) to put the PLC modem 100 in a communicable state. The button 106 is provided on the top of the casing 101 as an example, but is not limited to the position.

The power supply connector 102 is connected to a power supply cable (not shown), and the modular jack 103 is connected to a LAN cable (not shown). The PLC modem 100 may be further provided with a Dsub (D-subminiature) connector to connect a Dsub cable.

The PLC modem 100 is exemplified as an example of the power line communication apparatus, but an electric apparatus provided with a PLC modem therein may be used as the power line communication apparatus. As electric apparatuses, for example, there are home appliances such as televisions, telephones, video decoders, and set-top boxes, and office machines such as personal computers, facsimiles, and printers.

The PLC modem 100 is connected to a power line 700 to constitute a power line communication system together with the other PLC modem 100.

Figure 3:
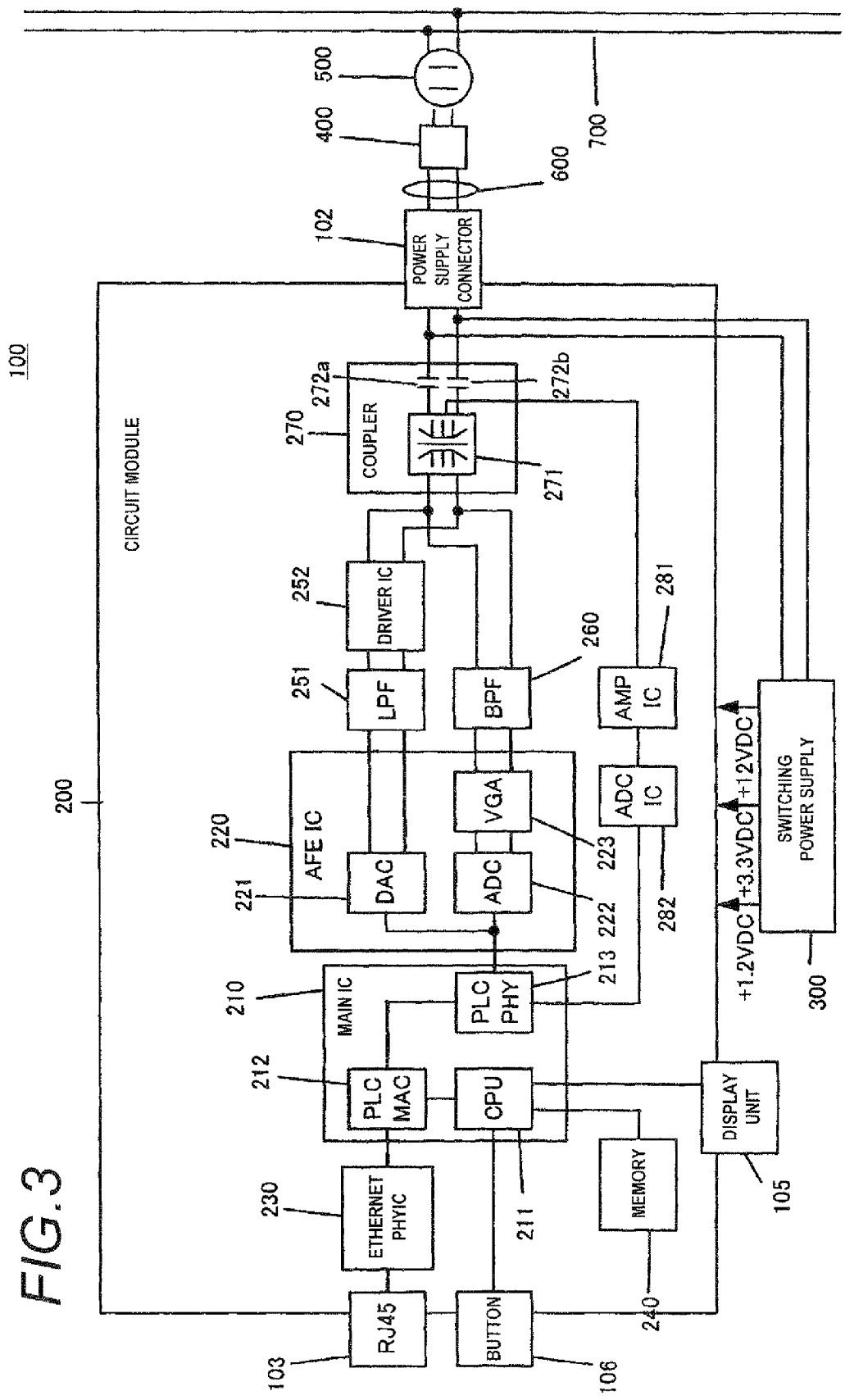
FIG. 3 is a diagram illustrating an example of hardware of the PLC modem according to the embodiment of the invention.

Next, FIG. 3 mainly shows an example of a hardware configuration of the PLC modem 100. The PLC modem 100 has a circuit module 200 and a switching power supply 300. The switching power supply 300 supplies various kinds (e.g., +1.2V, +3.3V, +12V) of voltage to the circuit module 200, for example, is configured by including a switching transformer and a DC-DC converter (all not shown).

The circuit module 200 is provided with a main IC (Integrated Circuit) 210, AFE•IC (Analog Front End•Integrated Circuit) 220, an Ethernet (registered trademark) PHY•IC (Physical layer Integrated Circuit) 230, a memory 240, a low pass filter (LPF) 251, a driver IC 252, a band pass filter (BPF) 260, a coupler 270, an AMP (amplifier) IC 281, and an ADC (AD conversion) IC 282. The switching power supply 300 and the coupler 270 are connected to the power supply connector 102, and are further connected to the power line 700 through a power supply cable 600, a power supply plug 400, and an outlet 500. In addition, the main IC 210 serves as a control circuit for performing power line communication.

The main IC 210 includes a CPU (Central Processing Unit) 211, a PLC MAC (Power Line Communication Media Access Control layer) block 212, and a PLC•PHY (Power Line Communication•Physical layer) block 213.

The CPU 211 is provided with a 32-bit RISC (Reduced Instruction Set Computer) processor therein. The PLC•MAC block 212 manages the MAC layer (Media Access Control layer) of transmission and reception signals, and PLC•PHY block 213 manages the PHY layer (Physical layer) of transmission and reception signals.

The AFE•IC 220 includes a DA converter (DAC: D/A Converter) 221, an AD converter (ADC: A/D Converter) 222, and a variable gain amplifier (VGA: Variable Gain Amplifier) 223. The coupler 270 includes a coil transformer 271 and coupling capacitors 272a and 272b.

The CPU 211 controls operations of PLC•MAC block 212 and the PLC•PHY block 213 using data stored in the memory 240, and controls the entire PLC modem 100.

The communication by the PLC modem 100 is performed schematically as follows. Data input from the modular jack 103 is transmitted to the main IC 210 through the Ethernet (registered trademark) PHY•IC 230, and a digital transmission signal is generated by performing a digital signal process. The generated digital transmission signal is converted into an analog signal by the DA converter (DAC) 221 of the AFE•IC 220, and is output to the power line 700 through the low pass filter 251, the driver IC 252, the coupler 270, the power supply connector 102, the power supply cable 600, the power supply plug 400, and the outlet 500.

The signal received from the power line 700 is transmitted to the band pass filter 260 through the coupler 270, a gain of the signal is adjusted by the variable gain amplifier (VGA) 223 of the AFE•IC 220, and then the signal is converted into a digital signal by the AD converter (ADC) 222. The converted digital signal is transmitted to the main IC 210 and is converted into digital data by performing a digital signal process. The converted digital data is output from the modular jack 103 through the Ethernet (registered trademark) PHY•IC 230.

An example of the digital signal process performed by the main IC 210 will be described. The PLC modem 100 uses multi carrier signals such as OFDM (Orthogonal Frequency Division Multiplexing) signals generated using a plurality of sub-carriers, as signals for transmission. The PLC modem 100 converts data of a transmission target into multi carrier transmission signals such as OFDM signals, outputs the signals, processes multi carrier reception signals such as OFDM signals, and convert it into reception data. The digital signal process for these conversions is performed mainly in the PLC•PHY block 213.

Figure 4:
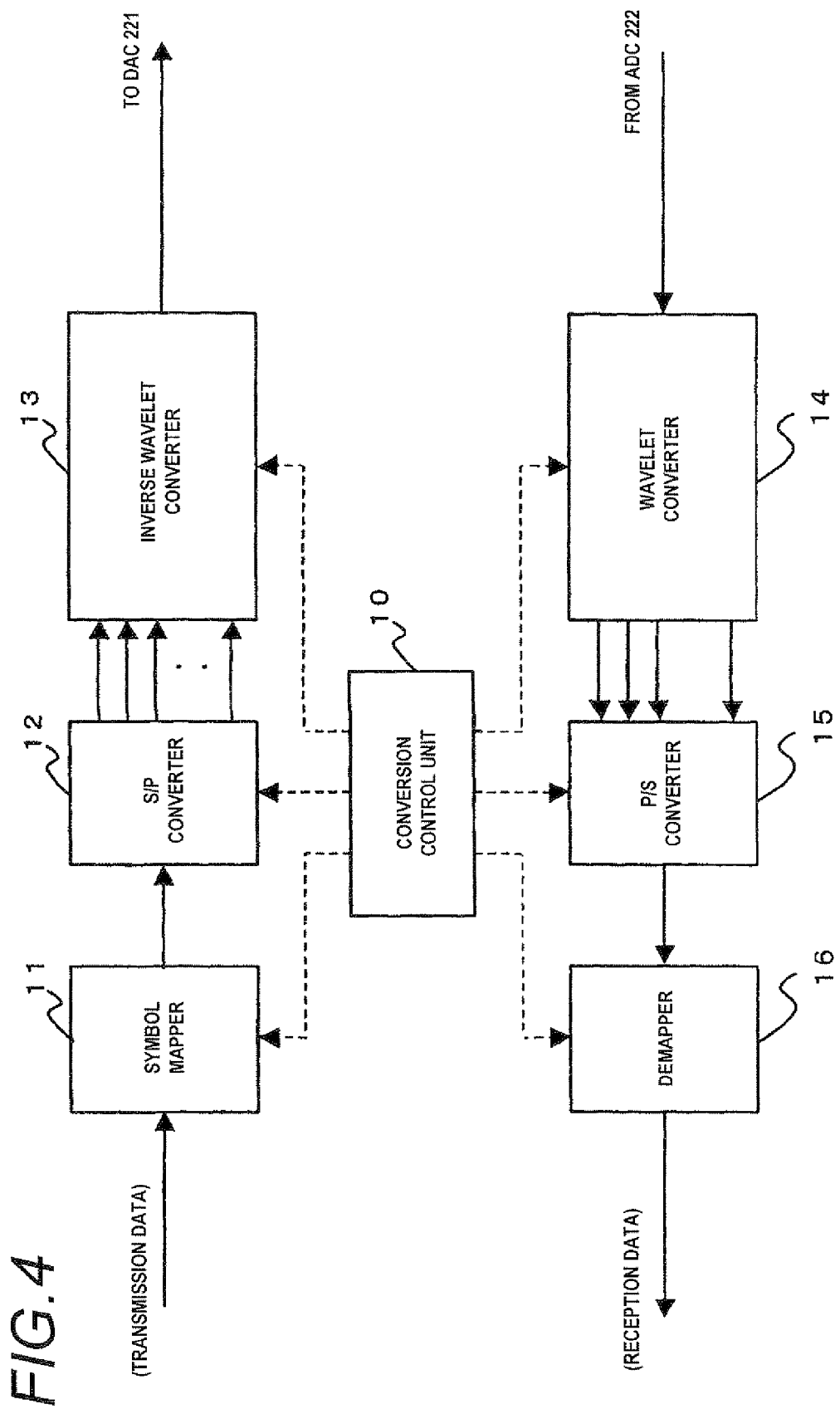
FIG. 4 is a diagram for explaining a digital signal process of the PLC modem according to the embodiment of the invention.

An example of a functional configuration necessary to perform the digital signal process performed by the PLC•PHY block 213 is shown in FIG. 4. The example shown in FIG. 4 shows a configuration of a case of performing OFDM transmission using wavelet conversion. As shown in FIG. 4, the PLC•PHY block 213 has functions of a conversion control unit 10, a symbol mapper 11, a serial-parallel (S/P) converter 12, an inverse wavelet converter 13, a wavelet converter 14, a parallel-serial (P/S) converter 15, and a demapper 16.

The symbol mapper 11 converts bit data to be transmitted into symbol data, and performs symbol mapping (e.g., PAM modulation) according to each symbol data. The serial-parallel converter 12 inputs the mapped serial data, converts the data into parallel data, and outputs the parallel data. The inverse wavelet converter 13 performs inverse wavelet conversion of the parallel data into data on the time axis, and generates a sample value series representing a transmission symbol. This data is transmitted to the DA converter (DAC) 221 of the AFE•IC 220.

The wavelet converter 14 performs discrete wavelet conversion of the reception digital data (sample value series sampled at the same sample rate as that at the time of transmission) obtained from the AD converter (ADC) 222 of the AFE•IC 220 on the frequency axis. The parallel-serial converter 15 rearranges the parallel data input as the data on the frequency axis, converts it into serial data, and outputs the serial data. The demapper 16 calculates an amplitude value of each sub-carrier to obtain reception data by performing determination of a reception signal.

The PLC•PHY block 213, the DAC 221, the LPF 251, and the driver IC 252 shown in FIG. 3 function as a data transmission unit that transmits various data. The PLC•PHY block 213, the ADC 222, the VGA 223, and the BPF 260 function as a data reception unit that receives various data. The data receiving unit functions as a carrier sensing unit that senses a carrier on the power line 700. The main IC 210 functions as a transmission control unit that controls data transmission by the transmission unit.

Figure 5:
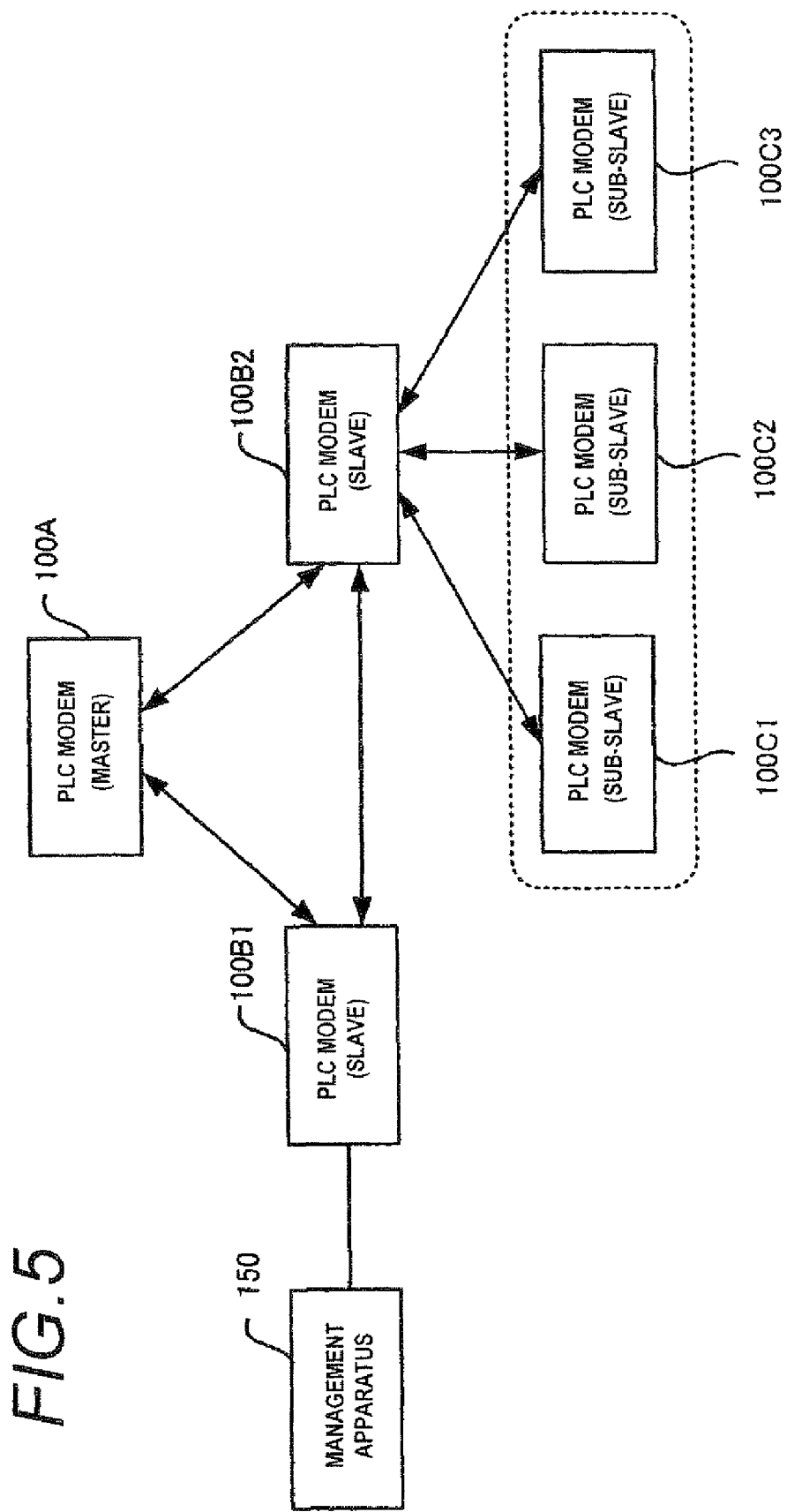
FIG. 5 is a block diagram illustrating an example of a configuration of a power line communication system according to the embodiment of the invention.

FIG. 5 is a configuration block diagram of a power line communication system as an example of a communication system. The power line communication system shown in FIG. 5 is provided with a PLC modem 100A, PLC modems 100B (PLC modems 100B1, 100B2, . . . ), PLC modems 100C (PLC modems 100C1, 100C2, 100C3, . . . ), and a management apparatus 150. The number of actually connected PLC modems may be increased and decreased as necessary. In FIG. 5, the PLC modem 100C is connected only to the PLC modem 100B2, but the PLC modem 100C may be connected to another PLC modem 100B.

Hereinafter, details common for all the PLC modems will be described merely as the PLC modem 100. Details common for the PLC modems 100B1 and 100B2 will be described merely as the PLC modem 100B. Details common for the PLC modems 100C1, 100C2, and 100C3 will be described merely as the PLC modem 100C.

In the power line communication system shown in FIG. 5, the PLC modems 100 are connected to the common power line 700, and share the common power line 700 as a transmission channel for communication. In addition, the CSMA/CA method is employed as basic communication control, and thus the power line communication system is controlled to reduce frequency when the plurality of PLC modems 100 simultaneously transmits signals. The PLC modems 100 share a communication band.

The PLC modem 100A has a function of operating as a master apparatus, and manages the PLC modem 100B connected thereunder and operating as a slave apparatus. For example, as a specific operation, the PLC modem 100A transmits a control signal such as a beacon signal to the power line 700. In addition, the PLC modem 100A assigns an access ID for allowing the PLC modem 100B to transmit a data frame to the power line 700. The PLC modem 100A controls transmission time of itself by a process shown in FIG. 9 to be described later. A slot counter for recognizing the present slot ID is kept, for example, by the PLC-MAC block 212 shown in FIG. 3 at the time of transmitting a data frame to the power line 700.

The PLC modem 100A stores identification information (e.g., MAC address) of the PLC modem 100B as a management target in a slave apparatus management table. The slave apparatus management table is stored, for example, in the memory 240 shown in FIG. 3. In the slave apparatus management table, an access ID may be registered by associating it with the identification information of the PLC modem 100B. In addition, the other necessary information may be stored. FIG. 6 is an example of the slave apparatus management table.

The PLC modem 100B has a function of operating as a slave apparatus, and manages the PLC modem 100C connected thereunder and operating as a sub-slave apparatus. For example, as a specific operation, the PLC mode 100B senses a control signal such as a beacon signal transmitted to the power line 700 by the PLC modem 100A and synchronizes with it. The PLC modem 100B recognizes an access ID assigned to itself by the PLC modem 100A. In addition, the PLC modem 100B controls transmission time of itself by a process shown in FIG. 9 to be described later. In addition, the same slot counter as the PLC modem 100A is kept, for example, by the PLC-MAC 212.

The PLC modem 100B stores identification information (e.g., MAC address) of the PLC modem 100C as a management target in a sub-slave apparatus management table. In addition, other necessary information may be stored. The sub-slave apparatus management table is stored, for example, in the memory 240 shown in FIG. 3. FIG. 7 is an example of the sub-slave apparatus management table.

The PLC modem 100C (100C1, 100C2, 100C3, . . . ) has a function of operating as a sub-slave apparatus. For example, as a specific operation, the PLC modem 100C controls transmission time of itself by a process shown in FIG. 11 to be described later. The PLC modem 100C has an inexpensive and a low-performance CPU as the CPU 211, as compared with the PLC modems 100A and 100B. As described above, the CPU 211 of the PLC modem 100C is relatively simple and light, and thus it is possible to reduce the cost of the apparatus.

The management apparatus 150 has a function for managing the entire power line communication system. For example, as a specific operation, the management apparatus 150 periodically collects information about the PLC modem 100C or transmits a command for controlling apparatuses connected to the PLC modem 100C. In addition, the management apparatus 150 performs system management such as change of an encryption key.

Figure 8A:
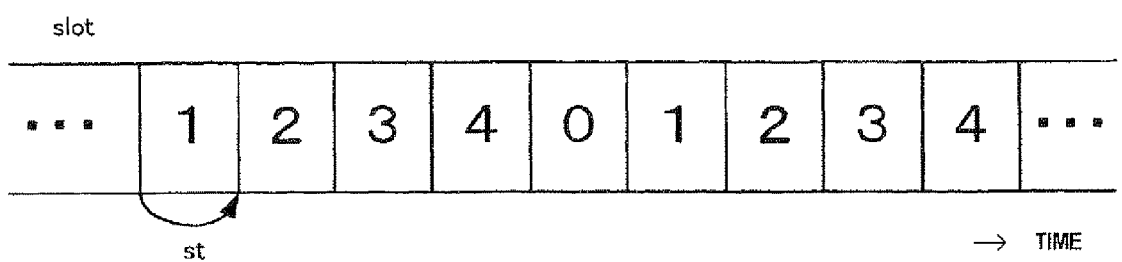
FIGS. 8A and 8B are diagrams for explaining transmission when the PLC modem performs data transmission according to the embodiment of the invention.
Figure 8B:
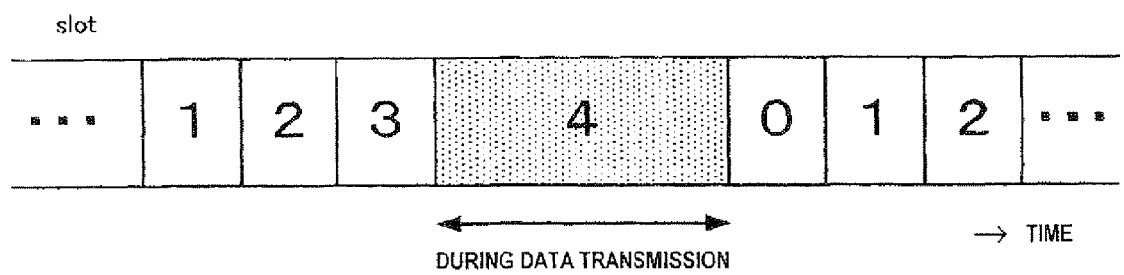

Next, the transmission time transmitted to the power line 700 by the PLC modem 100 will be described. FIGS. 8A and 8B illustrate an example of a time slot for performing data transmission.

In the example shown in FIG. 8A, a time domain (time slot) in which the PLC modem 100 can transmit data to the power line 700 is divided for each unit slot time st with a predetermined time length. Five slot IDs of 0, 1, 2, 3, and 4 are prepared as slot IDs for identifying slots. The slot ID is updated by a slot counter of the PLC modems 100A and 100B. The PLC modems 100A and 100B synchronize by a control signal such as a beacon, and circularly and simultaneously updates the slot IDs into 0, 1, 2, 3, 4, 0, 1, 2, ... In the range of 0 to 4. The PLC modem 100A can change the upper limit (herein, "4") of the slot ID.

The example shown in FIG. 8A is a state where the data frame is not transmitted to the power line 700, that is, a state where no carrier is sensed on the power line 700 even when performing carrier sense. The PLC modems 100A and 100B update the slot IDs at a predetermined interval (st). That is, during the unit slot time st, when no data frame is on the power line 700, the slot ID is updated by one. When the data frame is on the power line 700, the slot ID is updated by one after the transmission. In this case, while data frames are transmitted to the power line 700 by several PLC modems 100, the slot ID is not updated even when the unit slot time st elapses. Such an example is shown in FIG. 8B.

Next, assignment of access IDs to PLC modems 100A and 100B by PLC modem 100A will be described.

In order that the PLC modems 100 transmit the data frames actually using the time slots, it is necessary to acquire the right to use the time slots. The access ID is identification information for determining to use any slot in the time slots, and is managed mainly by the PLC modem 100A. The PLC modem 100A assigns access IDs different from each other to the PLC modem 100A and the PLC modem 100B. The PLC modem 100A dynamically assigns the access IDs to the PLC modem 100A and the PLC modem 100B. Note that, for example, the access ID that is 1 may be fixedly assigned to the PLC modem 100A.

At the time of assigning the access ID by the PLC modem 100A, for example, the PLC modem 100B performs transmission request. When the PLC modem 100A senses the transmission request, a free new access ID is assigned to the PLC modem 100B performing the transmission request. When the PLC modem to which the access ID is assigned completes the data transmission, the assignment of the access ID is released. For example, when a specific PLC modem 100B to which the access ID is assigned does not perform transmission during a predetermined time or more, the assignment of the access ID may be released. When the access ID is released, the access ID can be assigned to another PLC modem. Accordingly, it is possible to minimize the number of used access IDs, and thus it is possible to raise efficiency of using the transmission channel.

Each of the PLC modems 100A and 100B enters a state where data transmission can be performed, when the access ID corresponds to the slot ID of the slot counter provided therein. For example, the right to use the slot having the slot ID of 1 is assigned to the PLC modems 100A and 100B to which "1" is assigned as the access ID. In addition, the right to use the slot having the slot ID of 2 is assigned to the PLC modems 100A and 100B to which "2" is assigned as the access ID. In the embodiment, the case where the access ID coincides with the slot ID is exemplified, but alternatively, a slot ID "A" and a slot ID "B" may be associated with an access ID "1" and an access ID "2", respectively.

The PLC modem 100C is not managed by the PLC modem 100A, and thus the access ID is not assigned thereto. Accordingly, when the PLC modem 100C transmits a data frame to the power line 700, the access ID is acquired in a method different from that of the PLC modems 100A and 100B.

For example, the PLC modem 100C may acquire an access ID used by the other PLC modem 100 and transmitted to the power line 700, and may use the access ID. In addition, the PLC modem 100C may determine the access ID on the basis of a random number. Alternatively, the PLC modem 100C may acquire an access ID used by the other PLC modem 100 and transmitted to the power line 700, and then determine an access ID by combining the acquired access ID and a random number. Accordingly, there is no bias in the access IDs used by the PLC modem 100C, and thus it is possible to perform satisfactory communication.

Next, the data frame transmitted by the PLC modem 100 will be described.

The data frame of the PLC modem 100 includes an access ID used at the time of transmitting the data frame. It is preferable that the length of the data frame of the PLC modem 100C is shorter than those of the PLC modems 100A and 100B. Accordingly, for example, it is preferable that only simple control information is included in the data frame of the PLC modem 100C and information such as audio information and video information is not included therein. Therefore, in the power line communication system including the PLC modem 100C of which transmission time cannot be managed by the PLC modem 100A, it is possible to reduce possibility of occurrence of signal collision and to perform satisfactory communication.

Next, operations of the PLC modems 100 at the time of data transmission will be described.

Figure 9:
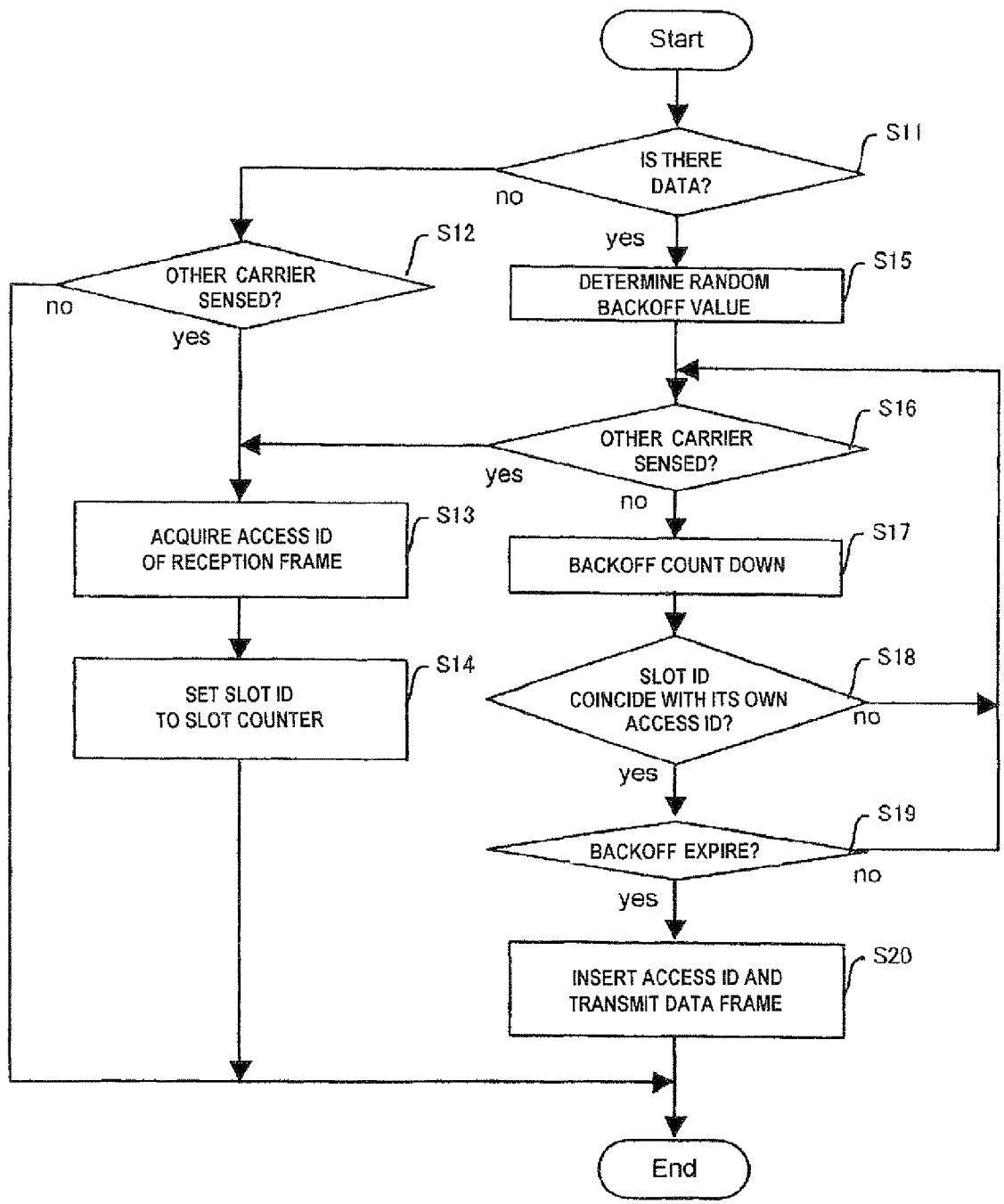
FIG. 9 is a flowchart illustrating an example of an operation of the PLC modem (master apparatus and slave apparatus) at the data transmission according to the embodiment of the invention.

First, operations of the PLC modems 100A and 100B at the time of data transmission will be described. FIG. 9 is a flowchart illustrating an example of the operation of the PLC modem 100B at the time of data transmission. Herein, the PLC modem 100B is described, but the same process is performed with respect to the PLC modem 100A. In addition, control at the time of data transmission is performed by the main IC 210.

In Step S11, the PLC modem 100B determines whether or not there is data to be transmitted in the PLC modem 100B. When there is data to be transmitted, the process proceeds to Step S15. When there is not data to be transmitted, the process proceeds to Step S12.

In Step S12, the PLC modem 100B determines whether or not a carrier is present on the power line 700 by performing predetermined carrier sense. When a carrier is sensed, the process proceeds to Step S13. When no carrier is sensed, the process ends. When there is no data to be transmitted by the PLC modem 100B, the carrier sense is performed at every unit slot time st.

In Step S13, the PLC modem 100B receives the signal present on the power line 700 and senses an access ID (access ID used by transmission sources) from the data frame of the received signal.

In Step 814, the PLC modem 100B sets a value to a slot ID of the slot counter, the value subsequent to the slot ID corresponding to the access ID of the transmission source sensed in Step S13.

Figure 12:
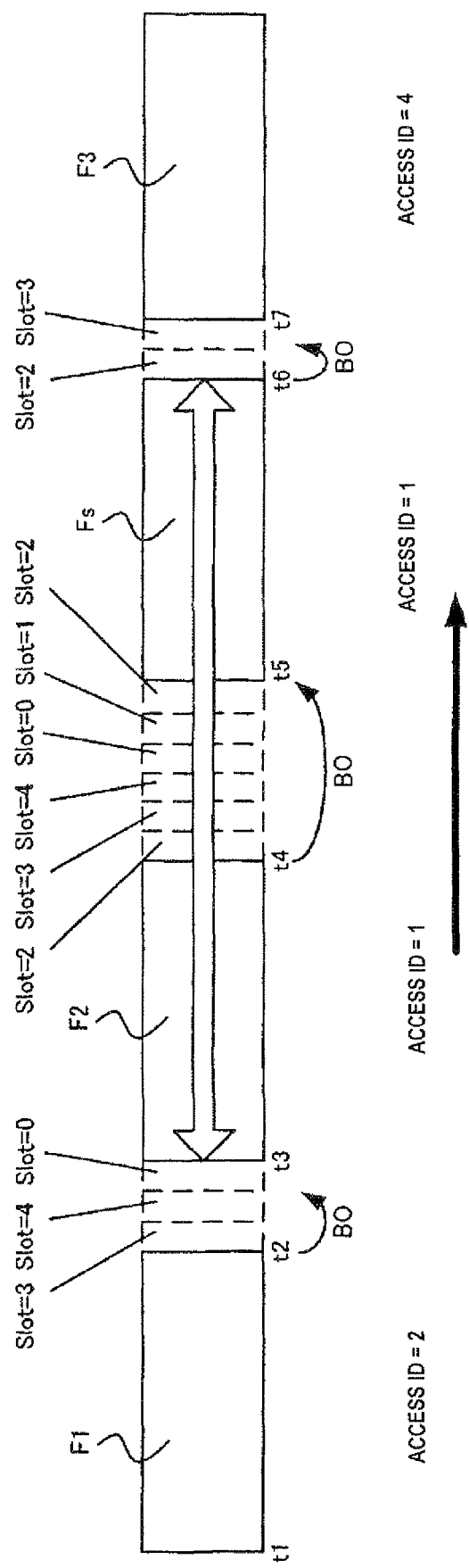
FIG. 12 is a time-series diagram illustrating an example of a data frame transmitted to a power line by the PLC modem according to the embodiment of the invention.

For example, the example of the operation shown in FIG. 12, the PLC modem 100B receives a data frame F1, senses "2" of an access ID, and sets "3" following "2" to the slot counter of the PLC modem 100B at the time t2.

When there is data to be transmitted, the process proceeds to Step S15. In Step S15, the PLC modem 100B determines a random backoff value. A result obtained by multiplying the random backoff value by the unit slot time st corresponds to a waiting time (backoff time).

Hereinafter, a specific example of the method of determining the backoff value will be described.

For example, using a table shown in FIGS. 10A and 10B, the backoff value is determined by a value of a fixed part, a value of a random part, and a predetermined random number algorithm. In the table shown in FIGS. 10A and 10B, the number of active IDs indicates the number of active access IDs presently assigned to the PLC modems 100A and 100B by the PLC modem 100A, and the priority difference indicates a difference between a priority assigned to itself and a maximum priority.

For example, when the number of active IDs is 4 and the priority difference is 3, 4 is obtained as the value of the fixed part from the table shown in FIGS. 10A and 7 is obtained as the value of the random part from the table shown in FIG. 10B. One integer in the range (4 to 11), in which the value of the fixed part is the lower limit and the value obtained by adding the value of the fixed part to the value of the random part is the upper limit, is calculated as the backoff value by the random number algorithm. The backoff value can be changed according to the priority of the managed data. For example, the priority can be set high with respect to audio information or video information requiring real time, and the priority can be set low with respect to simple control information.

Priority higher than that of the PLC modem 100C is assigned in advance to the PLC modem 100B by discrepancy of managed data, and the backoff time of the PLC modem 100B becomes shorter than the backoff time of the PLC modem 100C.

After determining the backoff value, in Step S16, the PLC modem 100B determines whether or not a carrier is present on the power line 700 by performing predetermined carrier sense. When the carrier is sensed, the process proceeds to Step S13. When no carrier is sensed, the process proceeds to Step S17.

In Step S17, to check whether or not the backoff time corresponding to the random backoff value determined in Step S15 elapses, the PLC modem 100B measures the elapsed time by a timer (not shown) to count down. Whenever the elapsed time passes by the unit slot time st, the slot ID of the slot counter is updated by 1.

In Step S18, the PLC modem 100B compares the slot ID of the slot counter with the access ID assigned in advance to the PLC modem 100B by the PLC modem 100A. When they coincide with each other, the process proceeds to Step S19. When they do not coincide with each other, the process returns to Step S16.

When individual access IDs are not acquired, a common access ID (e.g., ID=0) is used. When the master apparatus senses that the common access ID is used, the master apparatus transmits the individual access IDs to the corresponding slave apparatuses by beacons or the like.

In Step S19, the PLC modem 100B determines whether or not the backoff time elapses with reference to the timer. When the backoff time elapses, the process proceeds to Step S20. When the backoff time does not elapse, the process returns to Step S16.

In Step S20, the PLC modem 100B inserts the access ID assigned in advance to the PLC modem 100E into an area such as a header of the data frame, and transmits the data frame to the power line 700.

For example, in the example of the operation shown in FIG. 12 to be described later, the PLC modem 100B inserts "4" that is the access ID assigned to the PLC modem 100B, into the data frame F3 transmitted from the time t7.

Next, an operation of the PLC modem 100C at the time of data transmission will be described.

Figure 11:
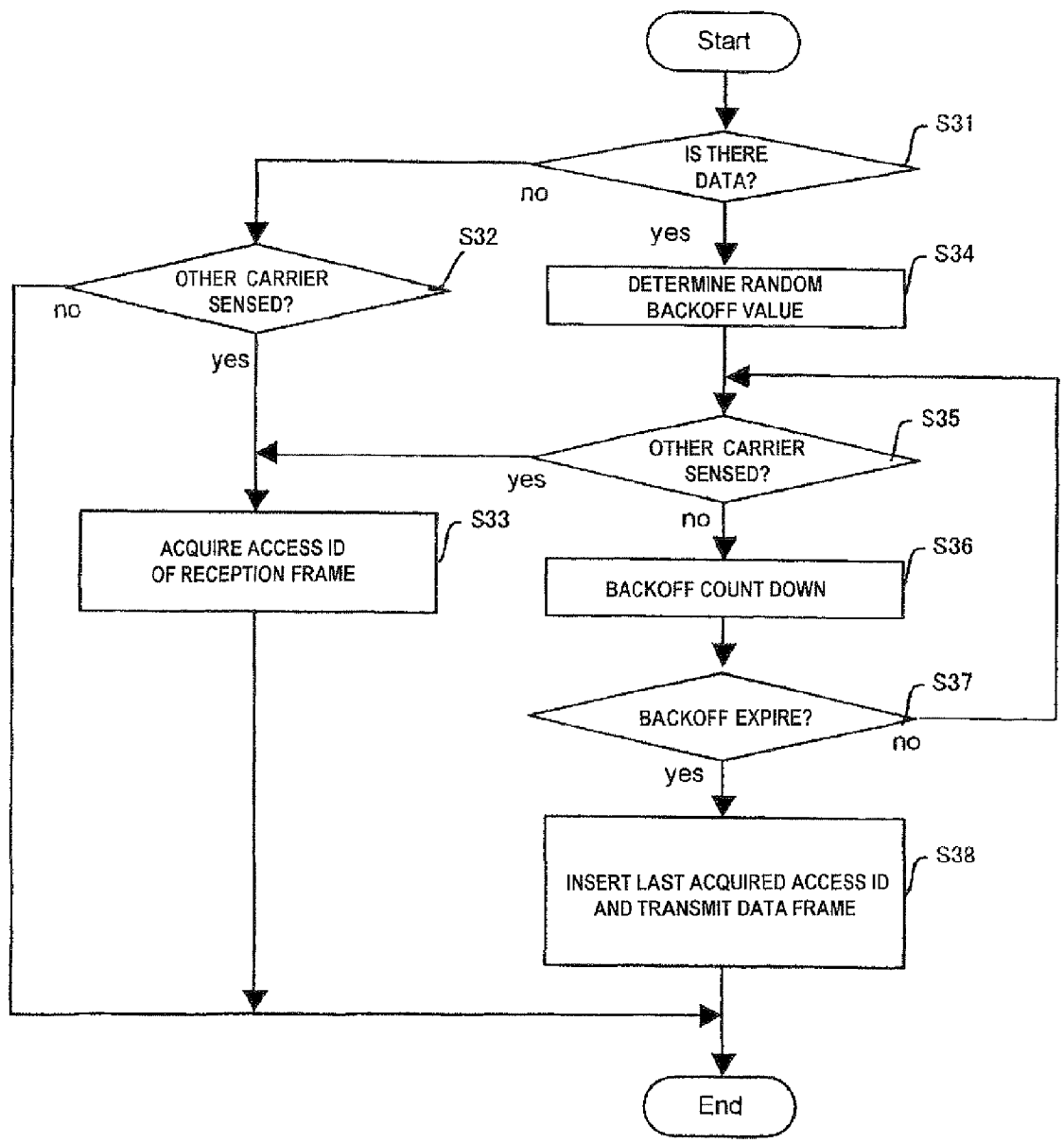
FIG. 11 is a flowchart illustrating an example of an operation of the PLC modem (sub-slave apparatus) at the data transmission according to the embodiment of the invention.

FIG. 11 is a flowchart illustrating an example of the operation of the PLC modem 100C at the time of data transmission. Control at the time of data transmission is performed by the main IC 210.

In Step S31, the PLC modem 100C determines whether or not there is data to be transmitted in the PLC modem 100C. When there is data to be transmitted, the process proceeds to Step S34. When there is no data to be transmitted, the process proceeds to Step 532.

In Step S32, the PLC modem 100C determines whether or not a carrier is present on the power line 700 by performing predetermined carrier sense. When the carrier is sensed, the process proceeds to Step S33. When no carrier is sensed, the process is ended.

In Step S33, the PLC modem 100C receives the signal present on the power line 700, and senses an access ID (access ID used by transmission sources) from the data frame of the received signal.

In Step S34, the PLC modem 100C determines a random backoff value. A result obtained by multiplying the random backoff value by the unit slot time st corresponds to a backoff time.

A method of determining the backoff value is the same as the case of the PLC modem 100B. However, the priority of the PLC modem 100C is lower than the priority of the PLC modems 100A and 100B, and thus the backoff value of the PLC modem 100C becomes larger than those of the PLC modems 100A and 100B. Accordingly, the backoff time of the PLC modem 100C becomes longer than those of the PLC modems 100A and 100B.

After determining the backoff value, in Step S35, the PLC modem 100C determines whether or not a carrier is present on the power line 700 by performing predetermined carrier sense. When the carrier is sensed, the process proceeds to Step S33. When no carrier is sensed, the process proceeds to Step S36.

In Step S36, in order to check whether or not the backoff time corresponding to the random backoff value determined in Step S34 elapses, the PLC modem 1000 measures the elapsed time by a timer (not shown) to count down.

In Step S37, the PLC modem 100C determines whether or not the backoff time elapses. When the backoff time elapses, the process proceeds to Step 838. When the backoff time does not elapse, the process returns to Step S35.

In Step S38, the PLC modem 100C inserts the access ID of the other PLC modem acquired from the received data frame at the former time (last) in Step S33, into an area such as a header of the data frame, and transmits the data frame to the power line 700.

That is, the PLC modem 1000, to which an access ID is not assigned by the PLC modem 100A, performs data transmission using the same value as the access ID used at the time of the last transmission by the other PLC modem as the access ID of the PLC modem 100C. In this case, another PLC modem may be the PLC modem 100C as well as the PLC modems 100A and 100B.

Accordingly, it is possible to avoid frequently using only a specific access ID. For this reason, even when there is a plurality of PLC modems 100C, there is no bias of used access IDs and thus the time slots can be sequentially used with equal frequency. Accordingly, it is possible to improve quality of communication in the power line communication system.

The PLC modem 100C uses the last used access ID. Accordingly, in the power line communication system, it seems that the PLC modem which performs data transmission at the last continues the data transmission.

By performing the processes shown in FIG. 9 and FIG. 11, the backoff time of the PLC modem 100C is longer than the backoff time of the PLC modems 100A and 100B, and thus it is possible to prevent transmission of the PLC modem 100C from being interrupted during the transmission of the PLC modems 100A and 100B. That is, the PLC modem 100C performs the data transmission during a period when the PLC modems 100A and 100B prearrange the use of the power line 700 for data transmission.

Next, an example of specific operations of the PLC modems 100 will be described with reference to FIG. 12. FIG. 12 is a time-series diagram illustrating the data frame transmitted to the power line 700 by the PLC modems 100. That is, an example of time slots at the time of actually performing communication is shown.

In the example shown in FIG. 12, "2" is assigned as the access ID of the PLC modem 100A and "1" is assigned as the access ID of the PLC modem 100B by the PLC modem 100A. Herein, it is assumed that the PLC modem 100A with an access ID of "2" first performs data transmission, and subsequently the PLC modem 100B with an access ID of "1" performs data transmission. It is assumed that a transmission request occurs in the PLC modem 100C after the PLC modem 100B starts the data transmission (after time t3). It is assumed that a transmission request occurs in the PLC modem 100A again after the PLC modem 100C starts the data transmission (after time t5).

First, in the slot (slot ID=2) from the time t1 to the time t2, the PLC modem 100A to which the access ID of "2" is assigned transmits the data frame F1. In the slots with the slot IDs 3, 4, and 0 from the time t2, there is no PLC modem transmitting a data frame to the power line 700. The PLC modem 100B transmits the data frame F2 to which the access ID "1" is assigned in the slot (slot ID=1) started from the time t3 after the backoff time (BO) corresponding to the backoff value of "2" elapses from the transmission completed time (time t2) of the data frame F1.

In the carrier sense before the time t4, the PLC modem 100C waiting for transmitting a data frame after the time t3 acquires the access ID of "1" included in the data frame from the frame F2 present on the power line 700 to sense a carrier.

At the time t4, when the PLC modem 100C senses the completion of the transmission of the data frame F2 (senses that there is not another carrier), the PLC modem 100C waits until the backoff time (BO) corresponding to the backoff value of "6" elapses. In the slots with the slot IDs 2, 3, 4, 0, 1 and 2 from the time t4, there is no PLC modem transmitting a data frame to the power line 700. When the backoff time (BO) elapses in the state where the carrier of the other PLC modem is not sensed, at the time t5, the PLC modem 100C starts transmitting the data frame Fs. When the PLC modem 100C transmits the data frame Fs, the access ID of "1" obtained from the last received data frame F2 is included in the data frame Fs and the data frame Fs is transmitted.

At the time t6, when the transmission of the data frame Fs is completed, the other PLC modems other than the PLC modem transmitting the data frame Fs identifies the subsequent slot ID as "2", since the access ID included in the data frame Fs is "1".

The PLC modem 100A waiting for transmitting a data frame after the time t5 waits until the backoff time (BO) corresponding to the backoff value of "1" elapses at the time t6. Herein, "4" is assigned as the access ID of the PLC modem 100A. In the slots with the slot IDs 2 and 3 from the time t6, there is no PLC modem transmitting a data frame to the power line 700. When the slot ID becomes the access ID of the PLC modem 100A after the backoff time (BO) elapses, the PLC modem 100A starts transmitting the data frame F3 at the time t7.

As shown in FIG. 12, the same access ID of "1" is included in the data frame F1 transmitted by the PLC modem 100B and the data frame Fs transmitted thereafter by the PLC modem 100C. Accordingly, the PLC modems other than the transmission sources recognize the data frame F2 and data frame Fs present on the power line 700 as one continuous long data frame. Therefore, in the power line communication system, it seems that the PLC modem 100B continues the data transmission.

Next, a modified example of an operation of the PLC modem 100C at the time of transmission will be described.

In the process shown in FIG. 11, the same value as the access ID sensed from the data frame received at the former time in the Step S33 is used in Step S38, but it may not be that the value is necessarily the same value.

Figure 13:
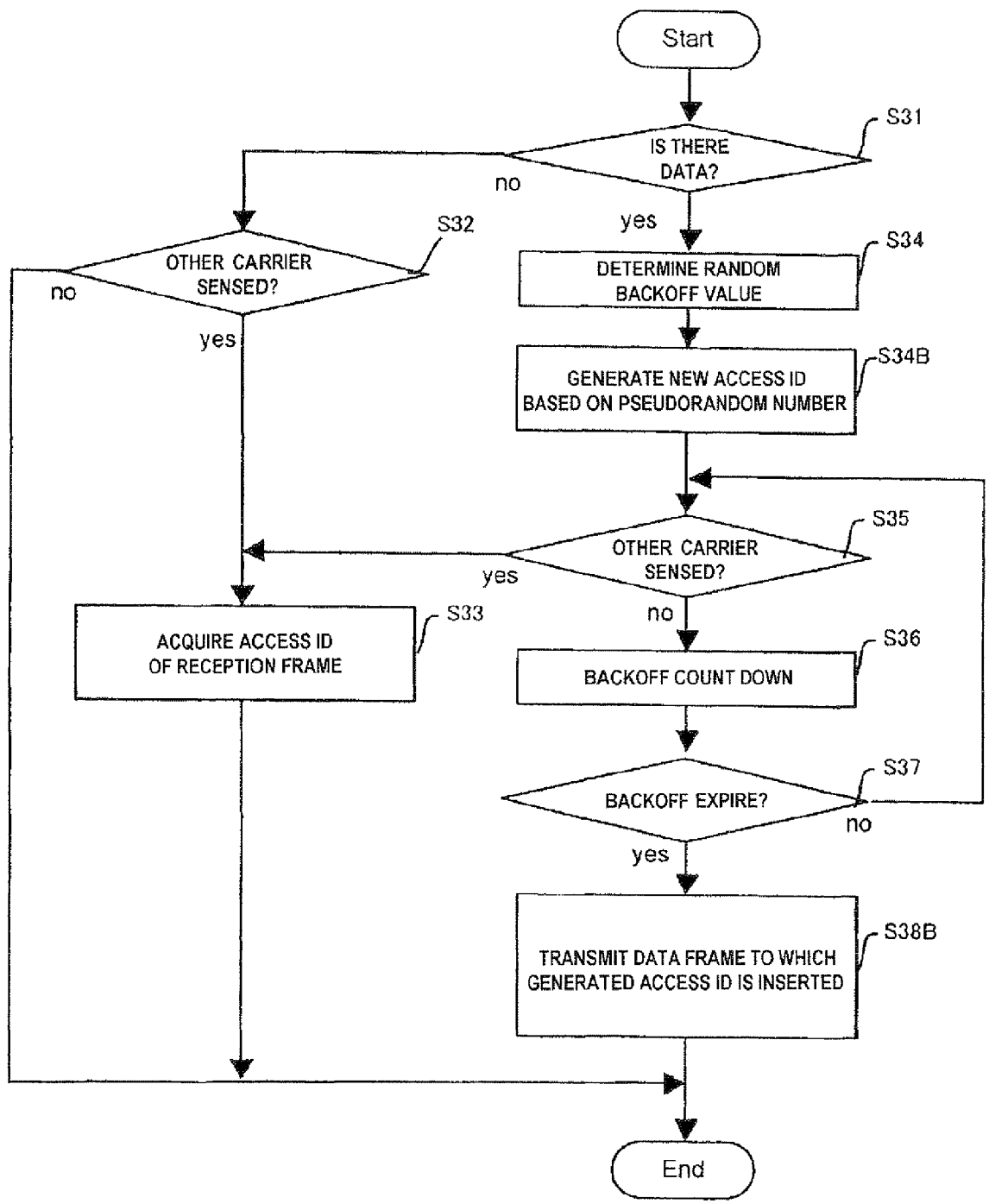
FIG. 13 is a flowchart illustrating another example of an operation of the PLC modem (sub-slave apparatus) at the data transmission according to the embodiment of the invention.

FIG. 13 is a flowchart illustrating the modified example of the operation of the PLC modem 100C at the time of transmission. In FIG. 13, the same numbers are given to the same steps as the steps shown in FIG. 11, and the description thereof is omitted or simplified. The process shown in FIG. 13 is different from the process shown in FIG. 11 in that new Step S34B is added between Step S34 and Step S35, and Step S38 is changed to Step S38B. Step S33 shown in FIG. 13 can be omitted.

In Step S34B, the PLC modem 100C generates a new access ID based on a random number (e.g., pseudo random number). In the case of generating the access ID, any one integer is selected using a random number generating algorithm in a range of assignable numerical values (in a range of 1 to 4 in the example shown in FIGS. 10A and 10B), the value is used as a new access ID.

In Step S38B, the PLC modem 100C inserts the newest access ID generated at the last in the Step S34B into an area such as a header of the data frame, and transmits the data frame to the power line 700. Accordingly, the value of the access ID used by the PLC modem 100C is generated on the basis of the random number, and thus the value is updated to a new ID whenever the PLC modem 100C transmits the data frame.

Therefore, it is possible to avoid frequently using only a specific fixed access ID. For this reason, even when there is a plurality of PLC modems 100C, there is no bias of used access IDs in a plurality of PLC modems 100C and thus the time slots can be sequentially used with equal frequency. Accordingly, it is possible to improve quality of communication in the power line communication system.

As described above, the above-described PLC modem 100C is added to the power line communication system configured by the PLC modems 100A and 100B, and thus it is possible to inexpensively build a power line communication system capable of avoiding signal collision with signals transmitted by the other PLC modems 100 on the power line 700. Particularly, there is an upper limit in the number of PLC modems 100B which can be registered so as to be managed by the PLC modem 100A, and thus it is effective in the case of building a large-scale power line communication system.

In the power line communication system provided with the PLC modems 100A to 100C, TDMA of determining transmission time by time slots and random access of randomly determining transmission time only by backoff time can coexist on the power line 700.

In the embodiment, the PLC modems 100 (PLC modems 100A to 100C) has been described, but the invention may be applied to electric apparatuses (e.g., television, microwave oven, air conditioner, refrigerator, etc.) provided with the PLC modems 100 therein.

In the embodiment, the power line communication system using the power line as the transmission channel has been described as a communication system, but the invention may be applied to, for example, a wireless system configured by a communication apparatus such as a wireless LAN.

This application is based upon and claims the benefit of priority of Japanese Patent Application No. 2009-000339 filed on Jan. 5, 2009, the contents of which are incorporated herein by reference in its entirety.

What is claimed is:

1. A communication method of communicating among a plurality of communication apparatuses connected to a transmission channel and sharing a communication band, the communication method comprising:
    a slot ID updating step of sequentially updating a slot ID with the lapse of time by a first communication apparatus, the slot ID for identifying a specific slot from a plurality of slots representing division of transmission time;
    a first transmitting step of transmitting first data and a first access ID to the transmission channel by the first communication apparatus after the lapse of a first waiting time and when the slot ID is updated to a first slot ID corresponding to the first access ID assigned to the first communication apparatus, during a carrier non-sense period when no carrier is sensed on the transmission channel;
    a first receiving step of receiving the first access ID by a second communication apparatus;
    a second transmitting step of transmitting second data and a second access ID to the transmission channel by a second communication apparatus after the lapse of a second waiting time longer than the first waiting time, during a carrier non-sense period when no carrier is sensed on the transmission channel, the second communication apparatus using the received first access ID as the second access ID; and
    a second receiving step of receiving the second slot ID by the first communication apparatus,
    wherein, in the slot ID updating step, the slot ID is updated to a slot ID subsequent to a slot ID corresponding to the second access ID.

2. The communication method according to claim 1, wherein, in the second transmitting step, the last received first access ID in the second receiving step is used as the second access ID.

3. The communication method according to claim 1, further comprising a third receiving step of receiving an access ID from an other communication apparatus by the second communication apparatus, wherein, in the second transmitting step, the second communication apparatus uses the access ID received from the other communication apparatus as the second access ID.

4. The communication method according to claim 3, wherein, in the second transmitting step, the last received access ID from the other communication apparatus in the third receiving step is used as the second access ID of the second communication apparatus.

5. The communication method according to claim 1, wherein the first waiting time is determined on the basis of priority in the first transmitting step, the second waiting time is determined on the basis of priority in the second transmitting step, and the priority of the first transmitting step is higher than the priority of the second transmitting step.

6. The communication method according to claim 1, wherein the frame length of the second data is shorter than the frame length of the first data.

7. The communication method according to claim 1, wherein a power line is used as the transmission channel to perform power line communication.

8. The communication method according to claim 1, wherein, in the slot ID updating step, the slot ID is updated periodically and cyclically.

9. The communication method according to claim 1, wherein, in the slot ID updating step, the slot ID is updated with a cycle of a slot time during a carrier non-sense period when no carrier is sensed on the transmission channel; whereas the slot ID is not updated during a carrier sense period when a carrier is sensed on the transmission channel, and the slot ID is updated to a slot ID subsequent to the second slot ID after the elapse of the carrier sense period.

10. A communication apparatus for communicating with another communication apparatus connected to a transmission channel and sharing a communication band, the another communication apparatus transmitting first data and a first access ID to the transmission channel, the communication apparatus comprising:
    a carrier sensing unit that senses whether or not a carrier is on the transmission channel;
    a receiving unit that receives the first access ID by a second communication apparatus; and
    a data transmitting unit that transmits second data and a second access ID, the second communication apparatus using the received first access ID as the second access ID, to the transmission channel after the lapse of a second waiting time longer than a first waiting time provided for transmitting data in the other communication apparatus provided with a slot counter for sequentially updating a slot ID for identifying a specific slot from a plurality of slots representing division of transmission time with the lapse of time, during a carrier non-sense period when no carrier is sensed by the carrier sensing unit.

11. The communication apparatus according to claim 10, wherein a power line is used as the transmission channel to perform power line communication.

* * * * *